(12) United States Patent
Fakoorian et al.

(10) Patent No.: US 11,778,572 B2
(45) Date of Patent: Oct. 3, 2023

(54) LITE SL-SS (SIDELINK SYNCHRONIZATION SIGNAL) TRANSMISSION FOR ON DEMAND S-SSB (SIDELINK SYNCHRONIZATION SIGNAL BLOCK)

(71) Applicant: QUALCOMM Incorporated, San Diego, CA (US)

(72) Inventors: Seyed Ali Akbar Fakoorian, San Diego, CA (US); Wanshi Chen, San Diego, CA (US); Krishna Kiran Mukkavilli, San Diego, CA (US); Seyedkianoush Hosseini, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/324,951

(22) Filed: May 19, 2021

(65) Prior Publication Data

US 2021/0368460 A1 Nov. 25, 2021

Related U.S. Application Data

(60) Provisional application No. 63/029,280, filed on May 22, 2020.

(51) Int. Cl.
*H04W 56/00* (2009.01)
*H04W 8/22* (2009.01)

(52) U.S. Cl.
CPC .......... *H04W 56/001* (2013.01); *H04W 8/22* (2013.01)

(58) Field of Classification Search
CPC ..... H04W 56/001; H04W 8/22; H04W 8/005; H04W 92/18; H04L 5/0091; H04L 5/0048
(Continued)

(56) References Cited

U.S. PATENT DOCUMENTS

2017/0188391 A1 6/2017 Rajagopal et al.
2020/0015214 A1* 1/2020 Si .................... H04W 72/0406
(Continued)

FOREIGN PATENT DOCUMENTS

EP 3836476 A1 6/2021
WO 2020029284 A1 2/2020

OTHER PUBLICATIONS

Intel Corporation: "NR V2X Sidelink Synchronization", 3GPP Draft, 3GPP TSG RAN WG1 Meeting #98, R1-1908636 Intel—EV2X SL Sync, 3rd Generation Partnership Project (3GPP), Prague, Czech Republic, Aug. 26-30, 2019, pp. 1-19, Retrieved from the Internet: URL: http://www.3gpp.org/ftp/tsg_ran/WG1_RL1/TSGR1_98/Docs/R1-1908636.zip [retrieved on Aug. 17, 2019].
(Continued)

*Primary Examiner* — Candal Elpenord
(74) *Attorney, Agent, or Firm* — Seyfarth Shaw LLP

(57) ABSTRACT

A method of wireless communications by a transmitting sidelink user equipment (UE) includes transmitting a sidelink synchronization signal (SL-SS) within a sidelink synchronization signal block (S-SSB). The SL-SS has an SL-SS pattern with a reduced number of physical sidelink broadcast channel (PSBCH) symbols, which may be zero PSBCH symbols. The method also includes receiving transmission in accordance with the SL-SS. The SL-SS may be transmitted at a time and/or frequency different from a legacy SL-SS.

28 Claims, 9 Drawing Sheets

(58) Field of Classification Search
USPC .......................................................... 370/350
See application file for complete search history.

(56) References Cited

U.S. PATENT DOCUMENTS

| 2021/0051641 | A1  | 2/2021  | Si et al. |
| 2021/0168574 | A1* | 6/2021  | Zhang .................. H04L 5/0048 |
| 2021/0250910 | A1* | 8/2021  | Park ...................... H04W 72/30 |
| 2021/0392592 | A1* | 12/2021 | Ko ........................ H04L 5/0048 |

OTHER PUBLICATIONS

International Search Report and Written Opinion—PCT/US2021/033473—ISA/EPO—dated Sep. 14, 2021.
LG Electronics: "Discussion on NR Sidelink Synchronization Mechanism", 3GPP Draft, 3GPP TSG RAN WG1 #98 Meeting, R1-1909518 Discussion on NR Sidelink Synchronization Mechanism_LG_R1, 3rd Generation Partnership Project (3GPP), Prague, Aug. 26-30, 2019, pp. 1-18, Retrieved from the Internet: URL: http://www.3gpp.org/ftp/tsg_ran/WG1_RL1/TSGR1_98/Docs/R1-1909518.zip. [retrieved on Aug. 23, 2019].
Qualcomm Incorporated: "Synchronization Design for NR V2X" 3GPP Draft, 3GPP TSG RAN WG1 Meeting #96bis, R1-1905010_Synchronization Design for NR V2X, 3rd Generation Partnership Project (3GPP), Xi 'an, China, Apr. 3-12, 2019,12 Pages, Retrieved from the Internet: URL: http://www.3gpp.org/ftp/Meetings%5F3GPP%5FSYNC/RAN1/Docs/R1%2D1905010%2Ezip [retrieved on Apr. 7, 2019].

* cited by examiner

LITE SL-SS (SIDELINK SYNCHRONIZATION SIGNAL) TRANSMISSION FOR ON DEMAND S-SSB (SIDELINK SYNCHRONIZATION SIGNAL BLOCK)

CROSS-REFERENCE TO RELATED APPLICATION

The present application claims the benefit of U.S. Provisional Patent Application No. 63/029,280, filed on May 22, 2020, and titled "LITE SL-SS (SIDELINK SYNCHRONIZATION SIGNAL) TRANSMISSION FOR ON DEMAND S-SSB (SIDELINK SYNCHRONIZATION SIGNAL BLOCK)," the disclosure of which is expressly incorporated by reference in its entirety.

FIELD OF THE DISCLOSURE

Aspects of the present disclosure generally relate to wireless communications, and more particularly to techniques and apparatuses for a lite SL-SS (sidelink synchronization signal) transmission for an on demand S-SSB (sidelink synchronization signal block).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipments (UEs), such as vehicles, may communicate directly with each other using device-to-device (D2D) communications over a D2D wireless link. These communications can be referred to as sidelink communications.

As the demands for sidelink communications increase, different V2X communications systems compete for the same wireless communications resources. Moreover, some sidelink UEs may be power limited. Accordingly, there is a need to improve the efficiency of sidelink wireless communications.

SUMMARY

In aspects of the present disclosure, a method of wireless communications by a transmitting sidelink user equipment (UE) includes transmitting a sidelink synchronization signal (SL-SS) within a sidelink synchronization signal block (S-SSB). The SL-SS has an SL-SS pattern with a reduced number of physical sidelink broadcast channel (PSBCH) symbols. The method further includes receiving transmissions in accordance with the SL-SS.

Other aspects of the present disclosure are directed to an apparatus for wireless communications at a transmitting sidelink user equipment (UE) having a processor, memory coupled with the processor, and instructions stored in the memory. When the instructions are executed by the processor, the apparatus transmits a sidelink synchronization signal (SL-SS) within a sidelink synchronization signal block (S-SSB). The SL-SS has an SL-SS pattern with a reduced number of physical sidelink broadcast channel (PSBCH) symbols. The apparatus also receives transmissions in accordance with the SL-SS.

In further aspects of the present disclosure, an apparatus for wireless communications at a user equipment (UE) includes means for transmitting a sidelink synchronization signal (SL-SS) within a sidelink synchronization signal block (S-SSB). The SL-SS has an SL-SS pattern with a reduced number of physical sidelink broadcast channel (PSBCH) symbols. The apparatus further includes means for receiving transmissions in accordance with the SL-SS.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
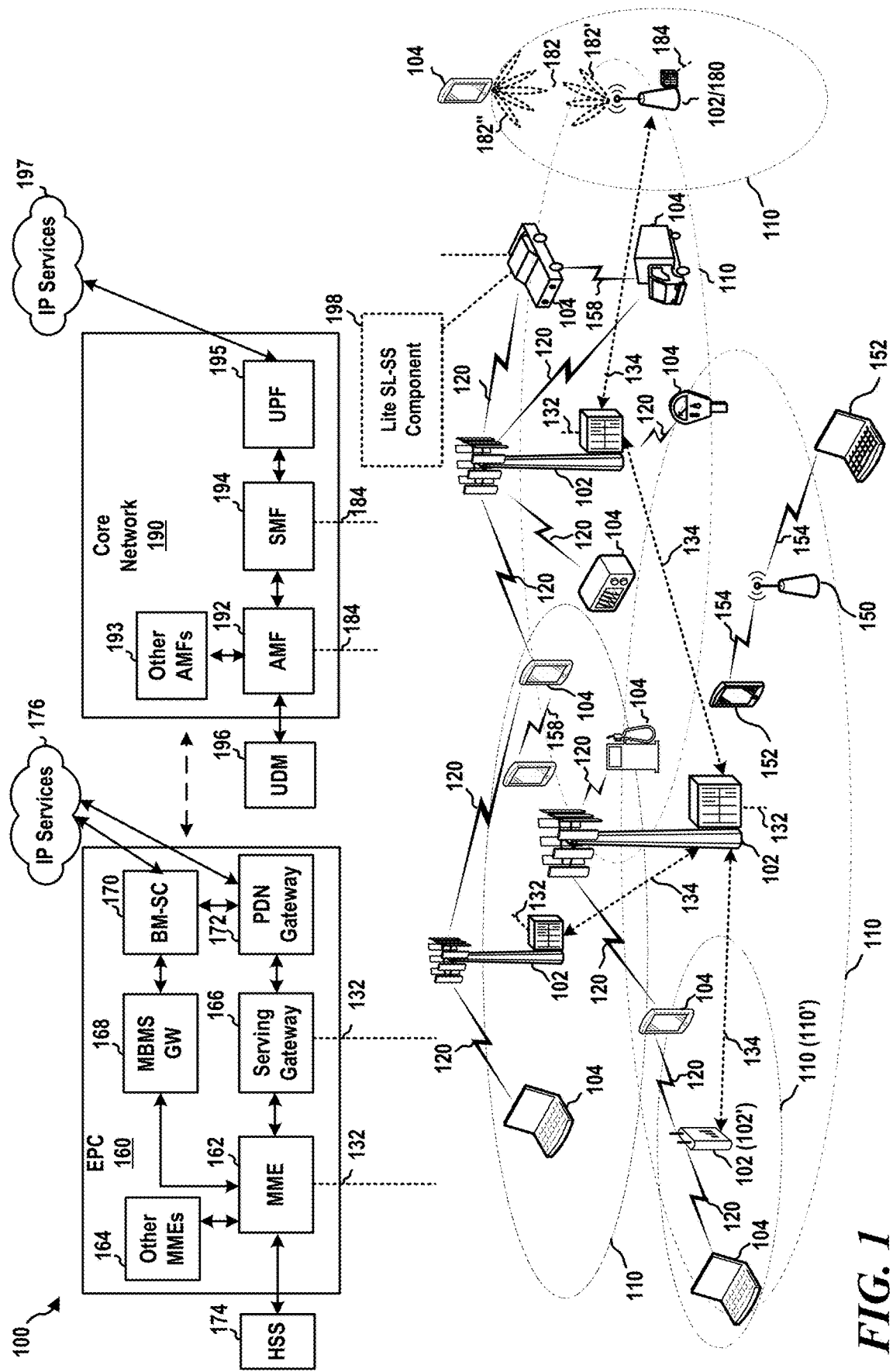
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency. A type of D2D communications may include vehicle-to-everything (V2X) communications. V2X communications may assist autonomous vehicles in communicating with each other.

In new radio (NR) vehicle-to-everything (V2X) communications, a transmitting sidelink UE and receiving sidelink UE should be synchronized to enable communications with one another, for example, for demodulation of received data. The UEs may be synchronized via a common base station or via synchronous base stations. When the UEs are in different non-synchronized cells or one or both of the UEs are out of network coverage, the UEs synchronize with one another via sidelink synchronization signals (SL-SSs).

The SL-SSs are transmitted within a sidelink synchronization signal block (S-SSB). The signals carried within the S-SSB include a sidelink primary synchronization signal (S-PSS), a sidelink secondary synchronization signal (S-SSS), and a physical sidelink broadcast channel (PSBCH). The S-PSS, S-SSS, and PSBCH together carry information such as a source ID of the transmitting UE, as well as synchronization information.

An S-SSB transmission can be both resource inefficient and power consuming. According to aspects of the present disclosure, a lite S-SSB (or lite SL-SS) achieves power savings and reduces system overhead for S-SSB transmissions. The lite SL-SS has a pattern with an S-PSS and/or S-SSS, with a reduced number of PSBCH symbols, for example zero PSBCH symbols. In further aspects of the present disclosure, a sidelink UE may use an SL-SS pattern based on instructions received from a gNB (e.g., for an in-coverage scenario) or a pre-configuration (e.g., for an out of coverage scenario). Alternatively, the sidelink UE may select the SL-SS pattern by itself, for example, when out of network coverage.

According to aspects of the present disclosure, the SL-SS pattern may implicitly indicate (or be based on) information related to the UE behavior. For example, the SL-SS pattern may implicitly indicate a UE transmit power, a UE mobility level, whether the UE is in-coverage or out of coverage, etc. In other aspects of the present disclosure, the SL-SS pattern explicitly indicates the information about the transmitting UE. Explicit and implicit signaling may be combined. For example, the selected pattern may implicitly indicate the transmit power while a sidelink service set identifier (SL-SSID) indicates whether the ULE is in-coverage.

From a receiving sidelink UE perspective, the lite SL-SS can have the same pattern as a legacy SL-SS. Alternatively, at the cost of more receiver complexity, the lite SL-SS may be transmitted with a different pattern, on a different frequency location, with a different (e.g., reserved) SL-SSID, and/or with a different timing offset.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., Si interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (TP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may distribute MBMS traffic to the base stations 102 belonging to a multicast broadcast single frequency network (MBSFN) area broadcasting a particular service, and may be responsible for session management (start/stop) and for collecting evolved multimedia broadcast multicast service (eMBMS) related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (TMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a sidelink UE, such as the UE 104, may transmit or receive a lite SL-SS (sidelink synchronization signal) with one or more other UEs 104. The UE 104 may include a lite SL-SS component 198 configured to transmit or receive the lite SL-SS without a PSBCH (physical sidelink broadcast channel).

Although the following description may be focused on 5G NR, the description may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power-limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2µ slots/subframe. The subcarrier spacing and symbol length/duration are a function of the numerology. The subcarrier spacing may be equal to $2^\mu*15$ kHz, where is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 s.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

In some aspects, the transmitting sidelink user equipment 350 may include means for transmitting, means for receiving, and/or means for selecting. Such means may include one or more components of the UE 350 described in connection with FIG. 3.

Figure 3:
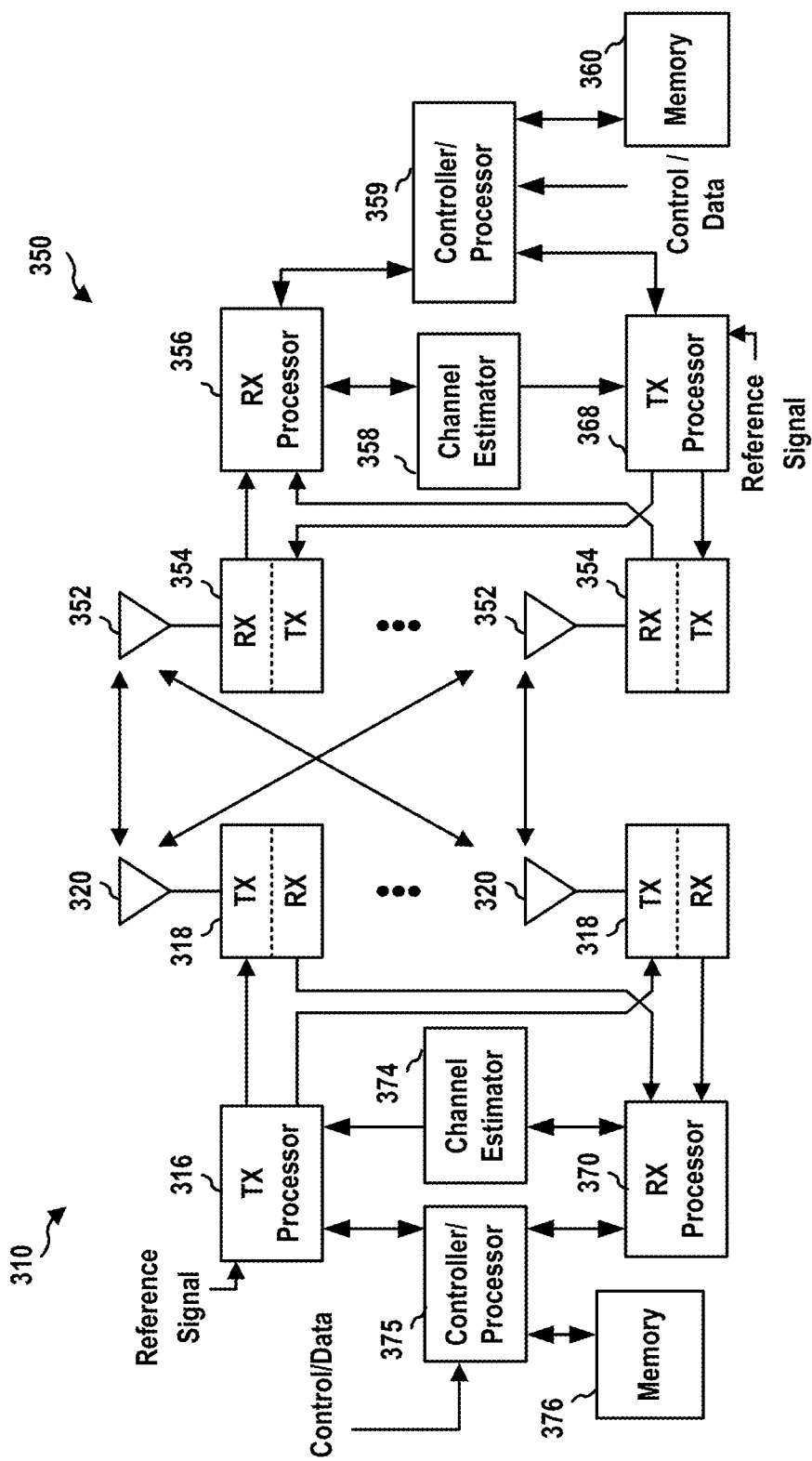
FIG. 3 is a block diagram illustrating an example of a base station in communication with a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat-request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the lite SL-SS component 198 of FIG. 1. Additionally, at least one of the TX processor 316, the RX processor 370, and the controller/processor 375 may be configured to perform aspects in connection with lite SL-SS component 198 of FIG. 1.

Figure 4:
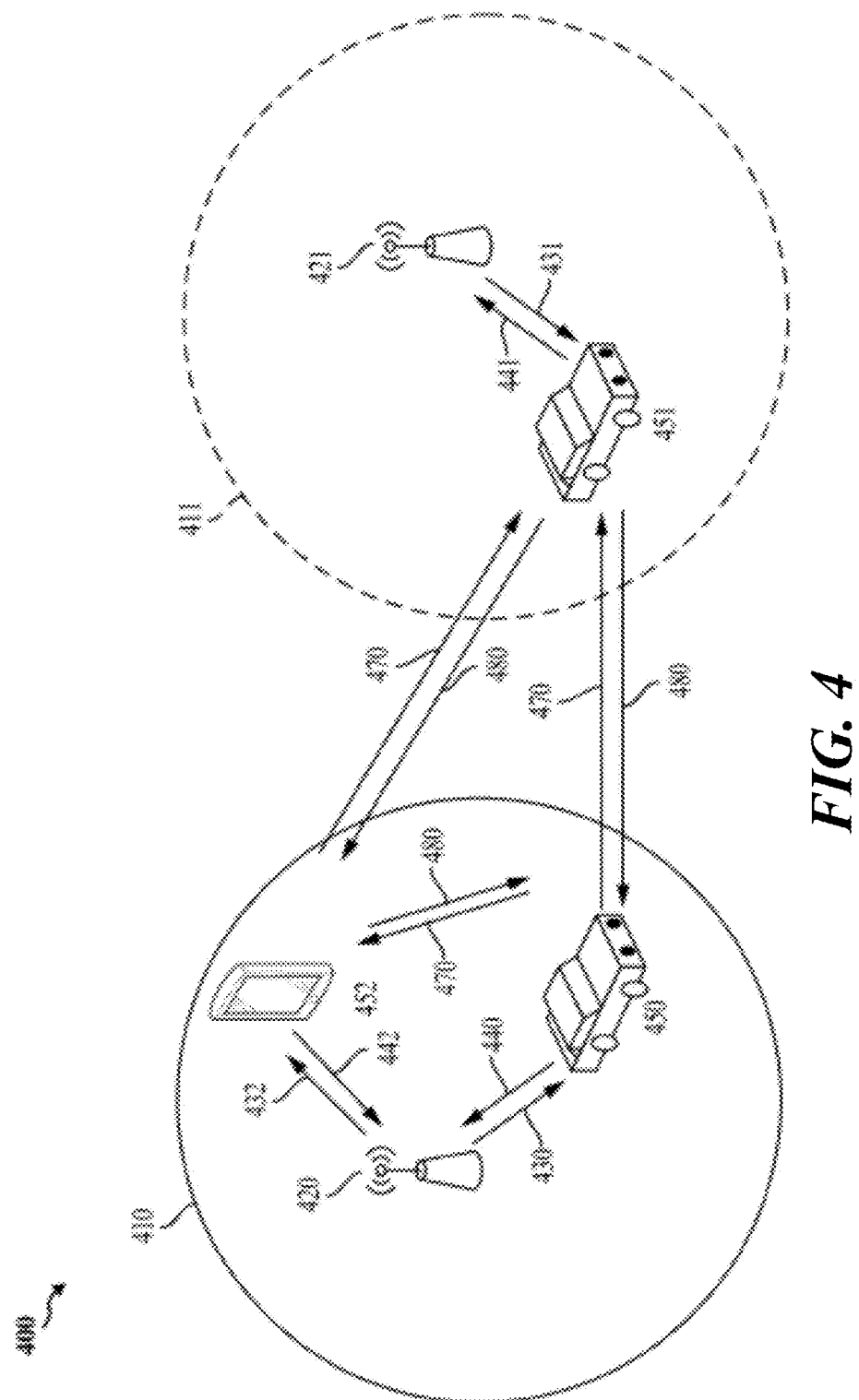
FIG. 4 is a diagram illustrating an example of a device-to-device (D2D) system including vehicle-to-everything (V2X) communications, in accordance with various aspects of the present disclosure.

FIG. 4 is a diagram of a device-to-device (D2D) communications system 400, including vehicle-to-everything (V2X) communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

Figure 2:
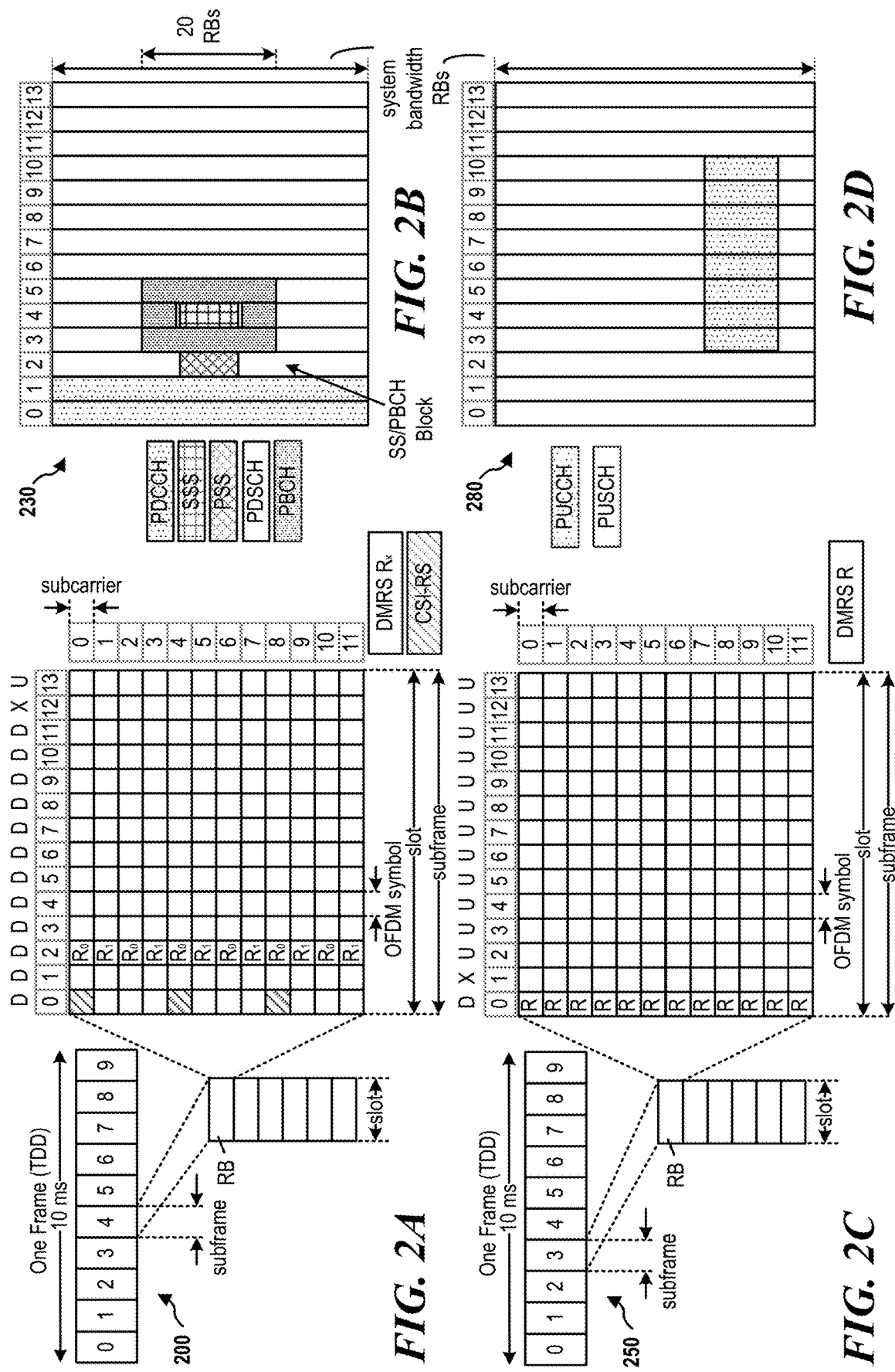
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more FDM channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., ULE 450, 451), a mobile device (e.g., 452), or another type of device. In some cases, a UE may be a special UE, such as a road side unit (RSU).

Figure 5:
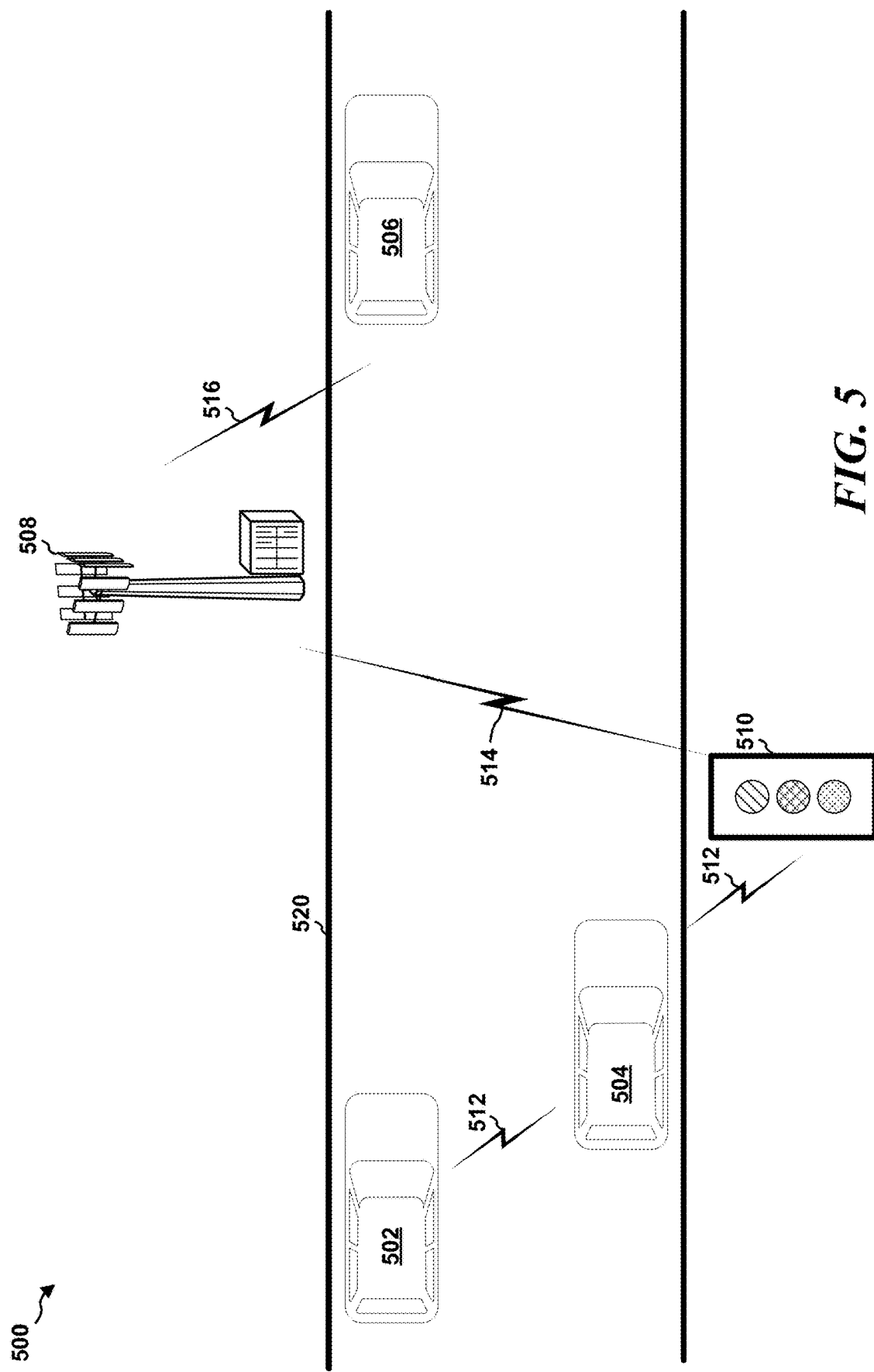
FIG. 5 is a block diagram illustrating an example of a vehicle-to-everything (V2X) system with a road side unit (RSU), according to aspects of the present disclosure.

FIG. 5 illustrates an example of a vehicle-to-everything (V2X) system 500 with a road side unit (RSU) 510, according to aspects of the present disclosure. As shown in FIG. 5, a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.). For example, as shown in FIG. 5, the RSU 510 is a traffic signal positioned at a side of a road 520. Additionally or alternatively, RSUs 510 may be stand-alone units.

In new radio (NR) vehicle-to-everything (V2X) communications, a transmitting sidelink user equipment (UE) and receiving sidelink UE should be synchronized to enable communications with one another, for example, for demodulation of received data. The UEs may be synchronized via a common base station or via synchronous base stations. When the UEs are in different non-synchronized cells or one or both of the UEs are out of network coverage, the UEs synchronize with one another via sidelink synchronization signals (SL-SSs). The SL-SSs are transmitted within a sidelink synchronization signal block (S-SSB). The signals carried within the S-SSB include a sidelink primary synchronization signal (S-PSS), a sidelink secondary synchronization signal (S-SSS), and a physical sidelink broadcast channel (PSBCH). The S-PSS, S-SSS, and PSBCH together carry information such as a source ID of the transmitting UE, as well as synchronization information.

The bandwidth of the S-SSB is eleven resource blocks (RBs) within the bandwidth of a pre-configured sidelink bandwidth part (SL-BWP). The UE assumes a same numerology of the SL-SS and PSBCH as a numerology of the SL-BWP of the SL-SS/PSBCH block reception. The frequency location for the S-SSB is pre-configured. A UE assumes a frequency location corresponding to the subcarrier with index 66 in the SL-SS/PSBCH block, which is provided by the parameter absoluteFrequencySSB-SL. Consequently, the UE does not perform hypothesis detection for the frequency location of the S-SSB for a carrier in a given band. In other words, the UE knows where to look for the S-SSB. The UE assumes the subcarrier with index 0 in the SL-SS/PSBCH block is aligned with a subcarrier with index 0 in the SL-BWP. It is noted that the potential pre-configured frequency locations may be restricted.

The S-SSB periodicity may be 160 ms for all sub-carrier spacing (SCS). The S-SSB resources in a time domain are pre-configured. The S-SSBs within the period of 160 ms are distributed with the same interval with the following pre-configured parameters: the offset from the start of the S-SSB period to the first S-SSB; and the interval between neighboring S-SSBs. The number of S-SSB transmissions within one S-SSB period is configurable for frequency range 1 (FR1-sub 6 GHz): 15 kHz SCS, {1}, 30 kHz SCS, {1 or 2}, 60 kHz SCS, {1, 2, or 4}, and for frequency range 2 (FR2-millimeter wave (mmW)): 60 kHz SCS, {1, 2, 4, 8, 16, or 32} and 120 kHz SCS, {1, 2, 4, 8, 16, 32, or 64}.

Figure 6:
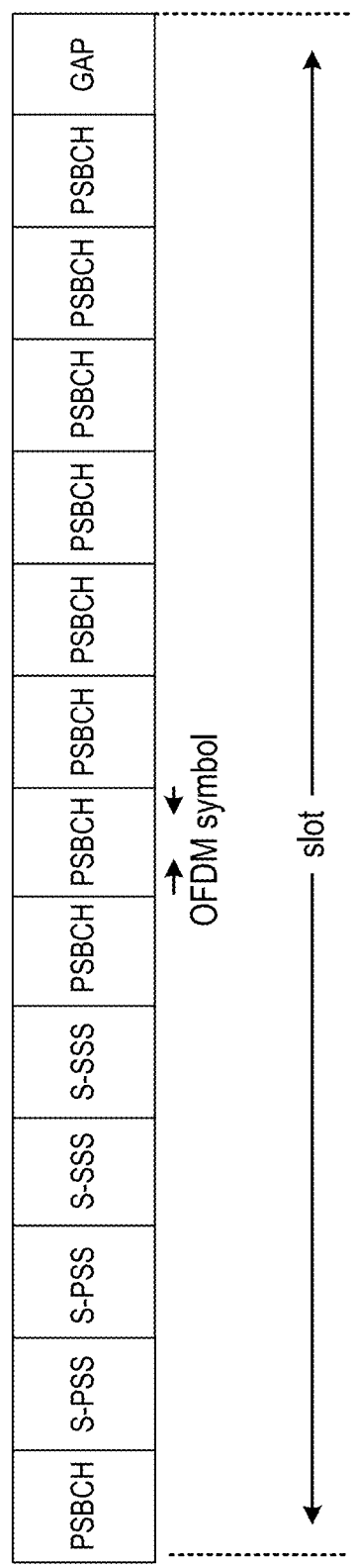
FIG. 6 is a block diagram illustrating orthogonal frequency-division multiplexing (OFDM) symbols of a legacy sidelink synchronization signal block (S-SSB), according to aspects of the present disclosure.

FIG. 6 is a diagram illustrating orthogonal frequency-division multiplexing (OFDM) symbols of a legacy sidelink synchronization signal block (S-SSB), according to aspects of the present disclosure. In particular, a new radio (NR) S-SSB structure for normal cyclic prefix is shown in FIG. 6. The first symbol is for PSBCH. The second and third symbols are for S-PSS. The fourth and fifth symbols are for S-SSS. The remaining symbols, except the last symbol, are for PSBCH. The last symbol is empty, forming a gap. No specific symbol(s) are reserved for automatic gain control (AGC) tuning. For the case of extended cyclic prefix, the structure is the same except the number of PSBCH symbols after the S-SSS is only six.

Both symbols of the sidelink primary synchronization signal (S-PSS) may use the same sequence. Length-127 M-sequences for the S-PSS use the same polynomial (e.g., $x^7+x^4+1$) and the same initial value, but different cyclic shifts {22, 65} than that of the NR downlink primary synchronization signal (DL-PSS). Additionally, both symbols of the sidelink secondary synchronization signal (S-SSS) may use the same sequence. Length-127 Gold sequences for the S-SSS reuse the same polynomials, initial values, and cyclic shifts as that of the Gold sequences of the NR downlink secondary synchronization signal (DL-SSS). The UE assumes that S-PSS symbol, S-SSS symbol, PSBCH demodulation reference signal (DM-RS), and PSBCH symbol data all have the same transmission power.

Different types of synchronization references are available. Example types of synchronization references include global navigation satellite system (GNSS)-based synchronization and gNB/eNB-based synchronization. Each type of synchronization reference has a respective synchronization priority, which is pre-configured. For a sidelink (SL) synchronization procedure, a UE selects the synchronization reference with the highest priority as the reference to derive its transmission timing. When two or more UE synchronization sources have a same priority, the UE selects the S-SSB with the highest reference signal received power (RSRP) as the synchronization source. The NR sidelink (SL) procedures for signaling, identifying priority for one or more synchronization references, and selecting the synchronization reference are similar to the long-term evolution (LTE) procedures.

The triggering of S-SSB transmission in NR V2X communications reuses the procedures from LTE V2X. That is, an in-coverage UE may be instructed by a gNB to become a synchronization reference and transmit a sidelink synchronization signal (SL-SS) to allow synchronization with other UEs. For example, the gNB may configure a threshold, such that when a downlink RSRP drops below the configured threshold, the UE becomes a synchronization source and transmits the SL-SS. An out of coverage UE may also become a synchronization reference when the UE has data to be sent. In this case, the UE transmits the SL-SS, for example, when an RSRP from the current synchronization reference (e.g., another SL UE) drops below a pre-configured RSRP threshold. As an example, once the out of coverage UE does not receive a synchronization signal, the UE may become a synchronization reference.

An S-SSB transmission may be resource inefficient and may also increase power consumption. For example, the described resource and power issues may occur if the sidelink (SL) UE transmitting the SL-SS is in deep coverage, if the SL UE transmitting the SL-SS is highly mobile, or if there is no nearby UE to respond. The described resource and power issues may also be present during beam management when the UE transmits the SL-SS on FR2 (frequency range two, e.g., mmW) where multiple S-SSB blocks are specified within each 160 ms for different beam directions. That is, more S-SSB occasions exist because each S-SSB can be transmitted on a different beam.

According to aspects of the present disclosure, a lite S-SSB (or lite SL-SS) achieves power savings and reduces system overhead for S-SSB transmissions.

In some aspects, a transmitting (TX) UE sends the lite SL-SS (or lite S-SSB). The lite SL-SS only includes an S-PSS and/or S-SSS without the PSBCH. As described above with respect to FIG. 6 for a normal CP (cyclic prefix) S-SSB, the PSBCH is present on nine out of fourteen symbols of each S-SSB. Thus, omitting the PSBCH reduces power for transmissions. In one configuration, the transmitting UE can be a power-limited sidelink UE, which may benefit from the power savings.

Figure 7:
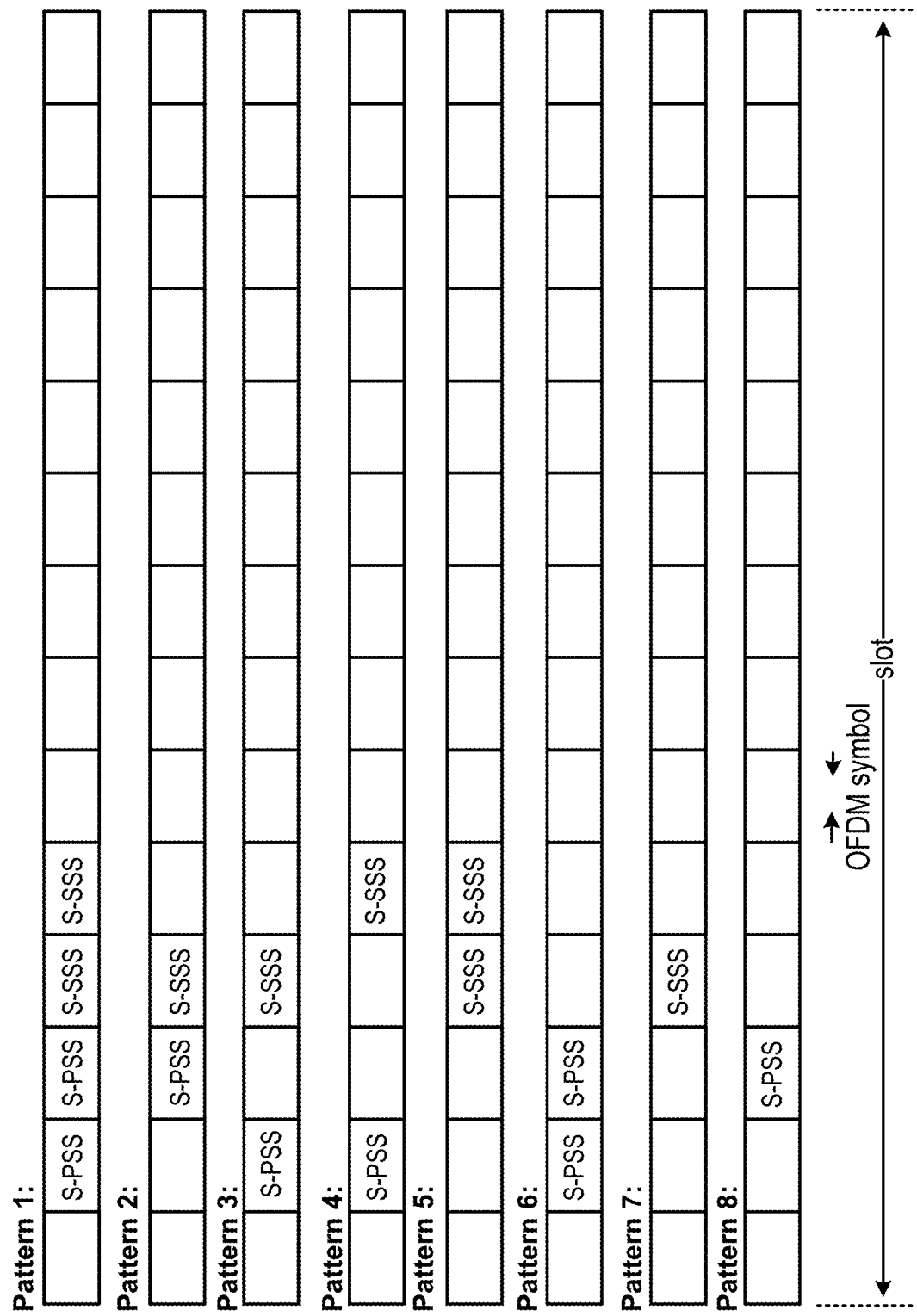
FIG. 7 is a block diagram illustrating patterns of a lite sidelink synchronization signal block (S-SSB), in accordance with various aspects of the present disclosure.

FIG. 7 is a block diagram illustrating patterns of a lite sidelink synchronization signal block (S-SSB), in accordance with various aspects of the present disclosure. As seen in patterns 1-8, the PSBCH is not transmitted. In pattern 1, two S-PSS symbols and two S-SSS symbols are present. In other aspects, as seen in patterns 2, 3, and 4, the sidelink UE transmitting the SL-SS transmits the S-PSS and S-SSS only once for each S-SSB (not twice per S-SSB as in pattern 1). In still other aspects, the sidelink UE transmits S-PSS only or S-SSS only, as seen in patterns 5, 6, 7, and 8.

In further aspects of the present disclosure, a sidelink UE may use the SL-SS pattern based on instructions received from a gNB (e.g., for an in-coverage scenario) or a pre-configuration (e.g., for an out of coverage scenario). Alternatively, the sidelink UE may select the SL-SS pattern by itself, for example, when out of network coverage. When the UE selects the pattern by itself, the receiving UE should know which pattern was selected.

Figure 8:
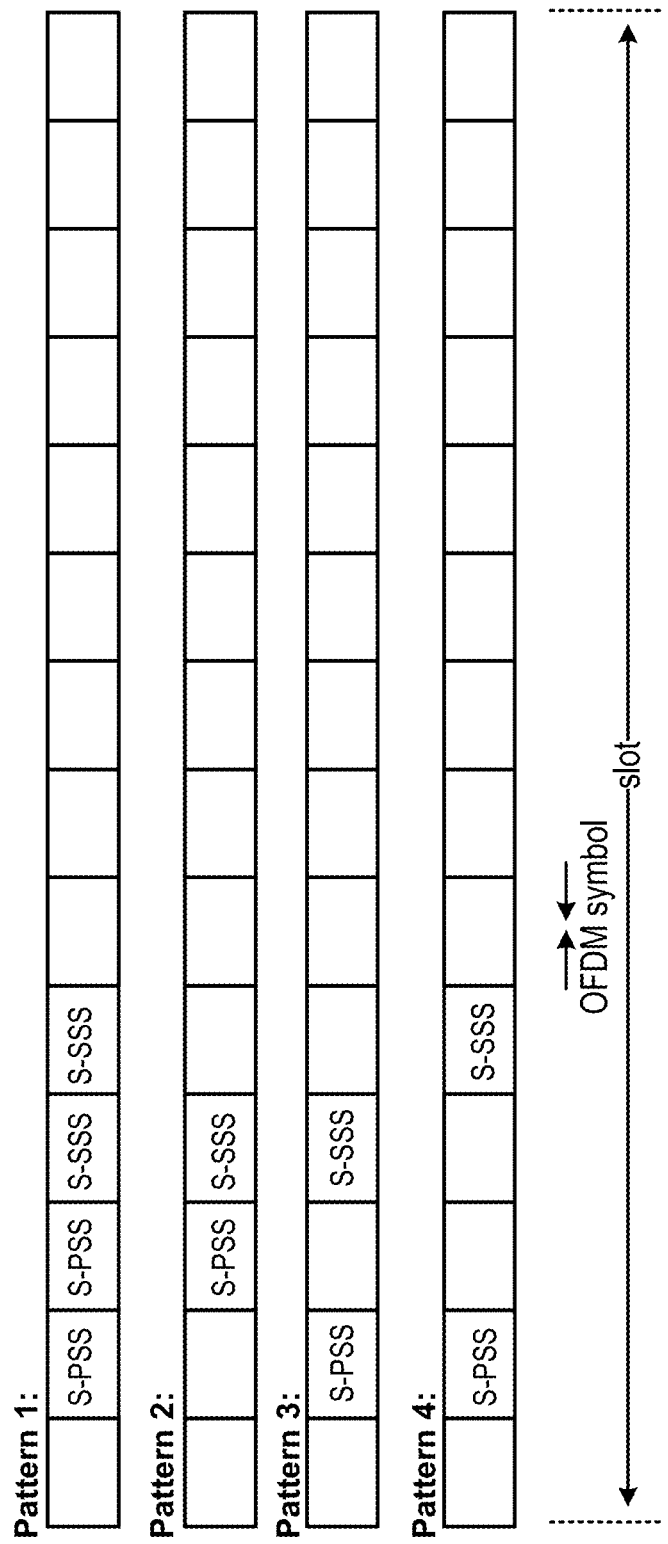
FIG. 8 is a block diagram illustrating a subset of the patterns shown in FIG. 7, in accordance with various aspects of the present disclosure.

According to aspects of the present disclosure, the SL-SS pattern may implicitly indicate (or be based on) information related to the UE behavior. For example, the SL-SS pattern may implicitly indicate a UE transmit power, a UE mobility level, whether the UE is in-coverage or out of coverage, etc. FIG. 8 is a block diagram illustrating a subset of the patterns shown in FIG. 7, in accordance with various aspects of the present disclosure. For example, as seen in FIG. 8, pattern 1 may indicate the sidelink UE transmitting the SL-SS is a high mobility UE. That is, the S-PSS and S-SSS symbols are repeated in pattern 1, helping the receiving UE to detect the signal while overcoming Doppler effects. In this example, other patterns indicate the sidelink transmitting UE is a low mobility and/or low power UE. In another example, patterns 2-4 may further indicate the sidelink transmitting UE is in network coverage (e.g., directly or indirectly) or out of network coverage. Based on the pattern detection, a receiving UE may learn more about the transmitting UE and may thus decide whether to synchronize with the transmitting UE.

In still other aspects of the present disclosure, the SL-SS pattern explicitly indicates information about the transmitting UE. For example, the SL-SS can explicitly indicate the UE transmit power, mobility level, whether the UE is in-coverage or not, etc. Currently, for NR V2X communications, the S-PSS and S-SSS together indicate 672 SL-SSIDs (sidelink service set identifiers). For example, SL-SSIDs {0, 1, . . . , 335} may represent either the transmitting UE is in-coverage or receives the synchronization signal from a UE in-coverage. The SL-SSIDs {336, 337, . . . 671} may represent that the transmitting UE has no connection to in-coverage UEs. The PSBCH may include a flag to indicate whether the UE transmitting the S-SSB itself is in-coverage of a cell.

According to aspects of the present disclosure, the SL-SSIDs are divided, as described above. Then, within each set of SL-SSIDs, further divisions into subsets indicate UE transmit power and/or mobility and/or coverage status (e.g., in-coverage or not). For example, the sets may indicate UE transmit power, and the subsets may indicate in-coverage status. In these aspects, two SL-SSID sets exist and a number of additional subsets are created.

In other aspects, an entirely new division of the SL-SSIDs occurs. For example, three sets of SL-SSIDs may be created by dividing the SSIDs into different sets and mapping the SL-SSIDs based on UE transmit power, mobility, coverage status, etc. An example of this aspect is when the SL-SSID carries X+Y+Z bits where X bits indicate UE transmit power, Y bits indicate mobility, and Z bits indicate coverage status.

Explicit and implicit signaling may be combined. For example, the selected pattern may implicitly indicate the transmit power while the SL-SSID indicates whether the UE is in-coverage.

From a receiving sidelink UE perspective, the lite SL-SS may have the same pattern as a legacy SL-SS (e.g., pattern 1). Alternatively, at the cost of more receiver complexity, the lite SL-SS may be transmitted with a different pattern (e.g., patterns 2-8), on a different frequency location, with a different (e.g., reserved) SL-SSID, and/or with a different timing offset. In some aspects of the present disclosure, the receiving sidelink UE searches for the lite SL-SS on a frequency (e.g., absoluteFrequencySSB-SL) either indicated by the gNB or pre-configured. The frequency may be the same as, or different from, the frequency of the legacy SL-SS. The transmitting sidelink UE, of course, transmits on this frequency. In these aspects, an indication, (e.g., a reserved SL-SSID and/or different frequency) indicates to the receiving UE whether a lite or legacy SL-SS is transmitted, to help the receiving UE decide whether to engage with the S-SSB.

In further aspects, a transmitting sidelink UE may transmit the lite SL-SS at a time offset (timeOffsetSSB-SL) either indicated by a gNB or pre-configured. The time offset may be different from or the same as a legacy SL-SS time offset. A different time offset may reduce interference from neighboring UEs on the lite SL-SS transmitted by a power-limited UE. The pre-configuration may be for a resource pool or for a sidelink carrier. In some aspects, the S-SSB patterns and/or the conditions to use them (e.g., power, mobility, etc.) may be pre-configured.

As indicated above, FIGS. 6-8 are provided as examples. Other examples may differ from what is described with respect to FIGS. 6-8.

Figure 9:
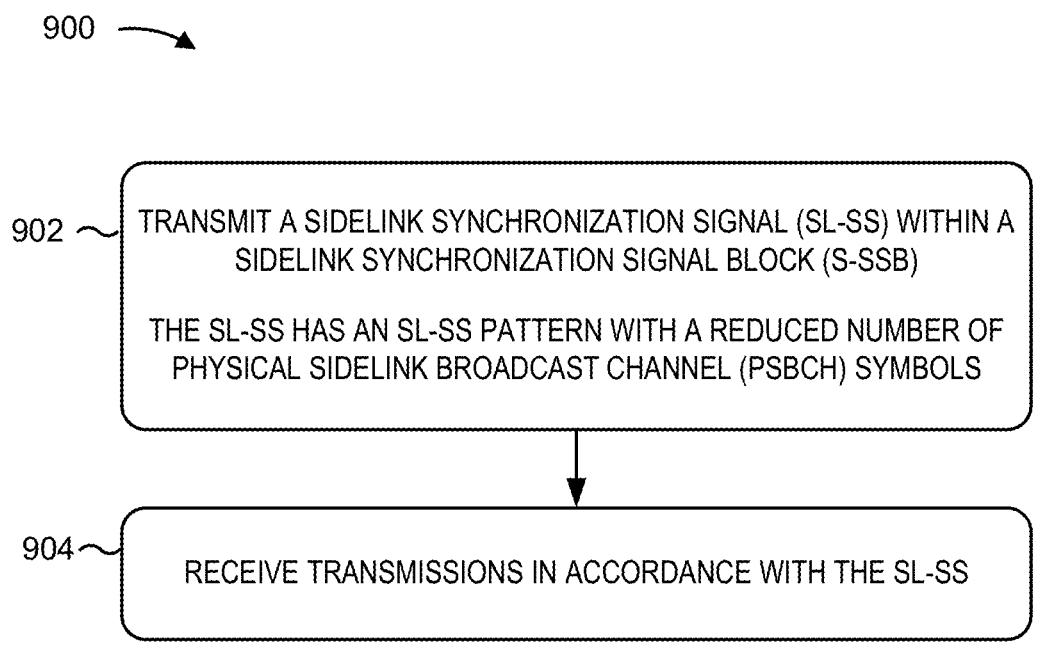
FIG. 9 is a flow diagram illustrating an example process performed, for example, by a sidelink user equipment, in accordance with various aspects of the present disclosure.

FIG. 9 is a flow diagram of a method of wireless communications, illustrating an example process 900 performed, for example, by a transmitting sidelink UE, in accordance with various aspects of the present disclosure. The process 900 is an example of lite SL-SS (sidelink synchronization signal) transmission for an on-demand S-SSB (sidelink synchronization signal block).

As shown in FIG. 9, in some aspects, the process 900 may include transmitting a sidelink synchronization signal (SL-SS) within a sidelink synchronization signal block (S-SSB) (block 902). The SL-SS has an SL-SS pattern with a reduced number of physical sidelink broadcast channel (PSBCH) symbols. For example, the UE (e.g. using the antenna 352, RX/TX 354, TX processor 368, controller/processor 359, and/or memory 360) may transmit the SL-SS with no PSBCH. The SL-SS pattern may be received from a network or pre-configured. The SL-SS pattern may explicitly or implicitly indicate various parameters for UE behavior. The sidelink UE may transmit the SL-SS at a frequency the same as or different from a legacy SL-SS. The sidelink UE may transmit the SL-SS at a same time or a different time than a legacy SL-SS. In some aspects, the SL-SS may be transmitted with a reserved SSID.

As shown in FIG. 9, in some aspects, the process 900 may include receiving transmissions in accordance with the SL-SS (block 904). For example, the UE (e.g. using the antenna 352, RX/TX 354, RX processor 356, controller/processor 359, and/or memory 360) can receive transmissions.

Implementation examples are described in the following numbered clauses.

1. A method of wireless communications by a transmitting sidelink user equipment (UE), comprising:
   transmitting a sidelink synchronization signal (SL-SS) within a sidelink synchronization signal block (S-SSB), the SL-SS having an SL-SS pattern with a reduced number of physical sidelink broadcast channel (PSBCH) symbols; and
   receiving transmissions in accordance with the SL-SS.
2. The method of clause 1, in which the reduced number of symbols comprises zero symbols.
3. The method of clause 1 or 2, in which the SL-SS pattern includes only a single sidelink primary synchronization signal (S-PSS) and a single sidelink secondary synchronization signal (S-SSS).
4. The method of any of the preceding clauses, in which the SL-SS pattern includes only a single sidelink primary synchronization signal (S-PSS).
5. The method of any of the preceding clauses, in which the SL-SS pattern includes only a plurality of sidelink primary synchronization signals (S-PSSs).
6. The method of any of the preceding clauses, in which the SL-SS pattern includes only a single sidelink secondary synchronization signal (S-SSS).
7. The method of any of the preceding clauses, in which the SL-SS pattern includes only a plurality of sidelink secondary synchronization signals (S-SSSs).
8. The method of any of the preceding clauses, further comprising:
   receiving the SL-SS pattern from a base station; and
   transmitting the SL-SS with the SL-SS pattern when the transmitting sidelink UE is in network coverage.
9. The method of any of the preceding clauses, in which the SL-SS pattern is pre-configured, and the method further comprises transmitting the SL-SS with the pre-configured SL-SS pattern when the transmitting sidelink UE is out of network coverage.
10. The method of any of the preceding clauses, further comprising:
    selecting the SL-SS pattern; and
    transmitting the SL-SS with the SL-SS pattern.
11. The method of any of the preceding clauses, in which the SL-SS pattern implicitly indicates a transmit power of the transmitting sidelink UE, a mobility level of the transmitting sidelink UE and/or whether the transmitting sidelink UE is in network coverage.
12. The method of any of the preceding clauses, in which the SL-SS pattern explicitly indicates a UE behavior.
13. The method of any of the preceding clauses, in which the UE behavior comprises a transmit power of the transmitting sidelink UE, a mobility level of the transmitting sidelink UE and/or whether the transmitting sidelink UE is in network coverage.
14. The method of any of the preceding clauses, in which the SL-SS pattern explicitly indicates via a sidelink service set identifier (SL-SSID) of the transmitting sidelink UE.
15. The method of any of the preceding clauses, in which the SL-SSID indicates more than two characteristics of the transmitting sidelink UE based on two sets of SSIDs, the two sets comprising a first set indicating whether the UE is in-coverage, and a second set indicating whether the UE is not in-coverage, the first set comprising at least two subsets, one of the subsets indicating a transmit power of the transmitting sidelink UE or a mobility level of the transmitting sidelink UE.
16. The method of any of the preceding clauses, in which the SL-SSID indicates more than two characteristics of the transmitting sidelink UE based on more than two sets of SSIDs.
17. The method of any of the preceding clauses, further comprising transmitting the SL-SS on a first frequency, the first frequency differing from a second frequency assigned to a legacy SL-SS.
18. The method of any of the preceding clauses, further comprising receiving an indication of the first frequency from a base station.
19. The method of any of the preceding clauses, in which the first frequency is pre-configured.
20. The method of any of the preceding clauses, further comprising transmitting the SL-SS on a frequency that is also assigned to a legacy SL-SS.
21. The method of any of the preceding clauses, further comprising transmitting the SL-SS at a first time that is offset from a second time during which a legacy SL-SS transmits.
22. The method of any of the preceding clauses, further comprising receiving an indication of the offset from a base station.
23. The method of any of the preceding clauses, in which the offset is pre-configured.
24. The method of any of the preceding clauses, further comprising transmitting the SL-SS at a time that is also assigned to a legacy SL-SS.
25. The method of any of the preceding clauses, further comprising transmitting the SL-SS with a reserved service set identifier (SSID).
26. An apparatus for wireless communications at a user equipment (UE), comprising:
    a processor;
    memory coupled with the processor; and
    instructions stored in the memory and operable, when executed by the processor, to cause the apparatus:

to transmit a sidelink synchronization signal (SL-SS) within a sidelink synchronization signal block (S-SSB), the SL-SS having an SL-SS pattern with a reduced number of physical sidelink broadcast channel (PSBCH) symbols; and to receive transmissions in accordance with the SL-SS.

27. The apparatus of clause 26, in which the reduced number of symbols comprises zero symbols.

28. The apparatus of clause 26 or 27, in which the SL-SS pattern explicitly indicates a UE behavior comprising a transmit power of the transmitting sidelink UE, a mobility level of the transmitting sidelink UE and/or whether the transmitting sidelink UE is in network coverage, the SL-SS pattern explicitly indicating via a sidelink service set identifier (SL-SSID) of the transmitting sidelink UE, the SL-SSID indicating more than two characteristics of the transmitting sidelink UE based on at least two sets of SSIDs, the at least two sets comprising a first set indicating whether the UE is in-coverage, and a second set indicating whether the UE is not in-coverage, the first set comprising at least two subsets, one of the subsets indicating the transmit power of the transmitting sidelink UE or the mobility level of the transmitting sidelink UE.

29. The apparatus of any of the clauses 26-28, in which the processor causes the apparatus to transmit the SL-SS on a first frequency, the first frequency differing from a second frequency assigned to a legacy SL-SS.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a transmitting sidelink user equipment (UE), comprising:

transmitting a sidelink synchronization signal (SL-SS) within a sidelink synchronization signal block (S-SSB), the S-SSB having an SL-SS pattern without physical sidelink broadcast channel (PSBCH) symbols and with only at least one sidelink primary synchronization signal (S-PSS) and/or at least one sidelink secondary synchronization signal (S-SSS), wherein the SL-SS pattern reduces overhead for the S-SSB; and receiving transmissions in accordance with the SL-SS.

2. The method of claim 1, in which the SL-SS pattern includes only a single sidelink primary synchronization signal (S-PSS) and a single sidelink secondary synchronization signal (S-SSS).

3. The method of claim 1, in which the SL-SS pattern includes only a single sidelink primary synchronization signal (S-PSS).

4. The method of claim 1, in which the SL-SS pattern includes only a plurality of sidelink primary synchronization signals (S-PSSs).

5. The method of claim 1, in which the SL-SS pattern includes only a single sidelink secondary synchronization signal (S-SSS).

6. The method of claim 1, in which the SL-SS pattern includes only a plurality of sidelink secondary synchronization signals (S-SSSs).

7. The method of claim 1, further comprising:
receiving the SL-SS pattern from a base station; and
transmitting the SL-SS with the SL-SS pattern when the transmitting sidelink UE is in network coverage.

8. The method of claim 1, in which the SL-SS pattern is pre-configured, and the method further comprises transmitting the SL-SS with the pre-configured SL-SS pattern when the transmitting sidelink UE is out of network coverage.

9. The method of claim 1, further comprising:
selecting the SL-SS pattern; and
transmitting the SL-SS with the SL-SS pattern.

10. The method of claim 1, in which the SL-SS pattern implicitly indicates a transmit power of the transmitting sidelink UE, a mobility level of the transmitting sidelink UE and/or whether the transmitting sidelink UE is in network coverage.

11. The method of claim 1, in which the SL-SS pattern explicitly indicates a UE behavior.

12. The method of claim 11, in which the UE behavior comprises a transmit power of the transmitting sidelink UE, a mobility level of the transmitting sidelink UE and/or whether the transmitting sidelink UE is in network coverage.

13. The method of claim 11, in which the SL-SS pattern explicitly indicates via a sidelink service set identifier (SL-SSID) of the transmitting sidelink UE.

14. The method of claim 13, in which the SL-SSID indicates more than two characteristics of the transmitting sidelink UE based on two sets of SSIDs, the two sets comprising a first set indicating whether the UE is in-coverage, and a second set indicating whether the UE is not in-coverage, the first set comprising at least two subsets, one of the subsets indicating a transmit power of the transmitting sidelink UE or a mobility level of the transmitting sidelink UE.

15. The method of claim 13, in which the SL-SSID indicates more than two characteristics of the transmitting sidelink UE based on more than two sets of SSIDs.

16. The method of claim 1, further comprising transmitting the SL-SS on a first frequency, the first frequency differing from a second frequency assigned to a legacy SL-SS.

17. The method of claim 16, further comprising receiving an indication of the first frequency from a base station.

18. The method of claim 16, in which the first frequency is pre-configured.

19. The method of claim 1, further comprising transmitting the SL-SS on a frequency that is also assigned to a legacy SL-SS.

20. The method of claim 1, further comprising transmitting the SL-SS at a first time that is offset from a second time during which a legacy SL-SS transmits.

21. The method of claim 20, further comprising receiving an indication of the offset from a base station.

22. The method of claim 20, in which the offset is pre-configured.

23. The method of claim 1, further comprising transmitting the SL-SS at a time that is also assigned to a legacy SL-SS.

24. The method of claim 1, further comprising transmitting the SL-SS with a reserved service set identifier (SSID).

25. An apparatus for wireless communications at a user equipment (UE), comprising:
a processor;
memory coupled with the processor; and
instructions stored in the memory and operable, when executed by the processor, to cause the apparatus:
to transmit a sidelink synchronization signal (SL-SS) within a sidelink
synchronization signal block (S-SSB), the S-SSB having an SL-SS pattern
without physical sidelink broadcast channel (PSBCH) symbols and with only at least one sidelink primary synchronization signal (S-PSS) and/or at least one sidelink secondary synchronization signal (S-SSS), wherein the SL-SS pattern reduces overhead for the S-SSB; and
to receive transmissions in accordance with the SL-SS.

26. The apparatus of claim 25, in which the SL-SS pattern explicitly indicates a UE behavior comprising a transmit power of the transmitting sidelink UE, a mobility level of the transmitting sidelink UE and/or whether the transmitting sidelink UE is in network coverage, the SL-SS pattern explicitly indicating via a sidelink service set identifier (SL-SSID) of the transmitting sidelink UE, the SL-SSID indicating more than two characteristics of the transmitting sidelink UE based on at least two sets of SSIDs, the at least two sets comprising a first set indicating whether the UE is in-coverage, and a second set indicating whether the UE is not in-coverage, the first set comprising at least two subsets, one of the subsets indicating the transmit power of the transmitting sidelink UE or the mobility level of the transmitting sidelink UE.

27. The apparatus of claim 25, in which the processor causes the apparatus to transmit the SL-SS on a first frequency, the first frequency differing from a second frequency assigned to a legacy SL-SS.

28. An apparatus for wireless communications by a transmitting sidelink user equipment (UE), comprising:
means for transmitting a sidelink synchronization signal (SL-SS) within a sidelink synchronization signal block (S-SSB), the S-SSB having an SL-SS pattern without physical sidelink broadcast channel (PSBCH) symbols and with only at least one sidelink primary synchronization signal (S-PSS) and/or at least one sidelink secondary synchronization signal (S-SSS), wherein the SL-SS pattern reduces overhead for the S-SSB; and
means for receiving transmissions in accordance with the SL-SS.

* * * * *